United States Patent [19]
Kilpatrick et al.

[11] Patent Number: 6,061,688
[45] Date of Patent: May 9, 2000

[54] GEOGRAPHICAL SYSTEM FOR ACCESSING DATA

[75] Inventors: Paul E. Kilpatrick, The Woodlands; H. Russell Helbig, League City, both of Tex.

[73] Assignee: Marathon Oil Company, Findlay, Ohio

[21] Appl. No.: 08/964,477

[22] Filed: Nov. 4, 1997

[51] Int. Cl.[7] .................................................. G06F 17/30
[52] U.S. Cl. ........................ 707/102; 235/494; 345/355; 379/211
[58] Field of Search ....................... 707/102, 2; 345/355, 345/341; 235/494, 454; 379/211, 16

[56] References Cited

U.S. PATENT DOCUMENTS

| | | | |
|---|---|---|---|
| 5,329,108 | 7/1994 | Lamoure | 235/494 |
| 5,379,419 | 1/1995 | Heffernan et al. | 395/600 |
| 5,448,726 | 9/1995 | Cramsie et al. | 395/600 |
| 5,550,965 | 8/1996 | Gabbe et al. | 395/154 |
| 5,619,710 | 4/1997 | Travis, Jr. et al. | 395/800 |
| 5,689,669 | 11/1997 | Lynch et al. | 345/355 |
| 5,727,057 | 3/1998 | Emery et al. | 379/211 |
| 5,799,310 | 8/1998 | Anderson et al. | 707/102 |

OTHER PUBLICATIONS

"Intelligent Archive: Integrated Data Access and Organization for Scientists", Livermore Computing, Intelligent Archive, information retrieved from the Internet in Jul. 1997.

*Primary Examiner*—Wayne Amsbury
*Assistant Examiner*—Thu-Thao Havan
*Attorney, Agent, or Firm*—Jack E. Ebel

[57] ABSTRACT

A computer system that creates a metadata file having records connected to geographic locations on a map. The system also stores data relating to geographic locations into the metadata file. A user of the system can then select a geographic location from the map, which causes the system to present a list of all data available for that location. From the list, the user selects data to be processed in some manner, and the system launches software to perform the processing on the data for the user. In addition, the system converts the data into a common data exchange format, so that the data can be processed using any program that can access the data exchange format. The system provides conversion software to convert to and from the data exchange format, for each type of software that is used by the system for processing data.

10 Claims, 3 Drawing Sheets

GEOGRAPHICAL SYSTEM FOR ACCESSING DATA

FIELD OF THE INVENTION

This invention relates to computer systems and more particularly to data retrieval within such computer systems. Even more particularly, the invention relates to retrieving data through digital maps.

BACKGROUND OF THE INVENTION

Scientists require access to disparate types of information, including computed and experimental data, papers, reports, and notes. This information is often associated, in some way, with a particular geographic location. For example, there is typically a collection of data about each geological formation that contains minerals.

The data may have been collected by various means, each of which uses a different data format, for example well logs and directional surveys about a formation. Typically, a different computer program is used to display or analyze each of the data formats. Thus if a scientist wants to view a particular type of data for a particular formation, the scientist must locate the data for the formation, identify its type, locate the computer program capable of displaying the type of data, and then start the program while identifying the particular data file to be processed. If the user misidentifies the type of data, the program chosen will cause an error, but usually will not identify the type of program capable of processing the data. If the user misidentifies the particular data file, but correctly identifies the type of data contained in the file, the processing program will helpfully provide data for the wrong formation, and unless the user quickly recognizes the error, the user may spend considerable time analyzing the wrong data.

It is thus apparent that there is a need in the art for an improved method of providing access to data that provides the correct data for a geographic location and also provides the correct program to process the data. The present invention meets these and other needs.

SUMMARY OF THE INVENTION

It is an aspect of the present invention to allow a user to access data for a particular geographic location by selecting the location on a digital map.

It is another aspect of the invention to collect metadata about each type of data stored within a system along with the geographic location to which the data applies, and to access the metadata through the digital map.

Another aspect of the invention is to accept user input that identifies a geographic location on the digital map, retrieve the metadata connected to the location, identify the data available for the location, identify a program capable of processing the data, and execute the program to process the data for the user.

The above and other aspects of the invention are accomplished in a system that creates a metadata file having records connected to geographic locations on a map. The system also stores data relating to geographic locations into the metadata file. A user of the system can then select a geographic location from the map, and the system will present a list of all data available for that location. From the list, the user selects data to be processed in some manner, and the system launches software to perform the processing on the data for the user.

In addition, the system converts the data into a common data exchange format, so that the data can be processed using any program that can access the data exchange format. Typically, the system provides conversion software to convert to and from the data exchange format, for each type of software that is used by the system for processing data.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
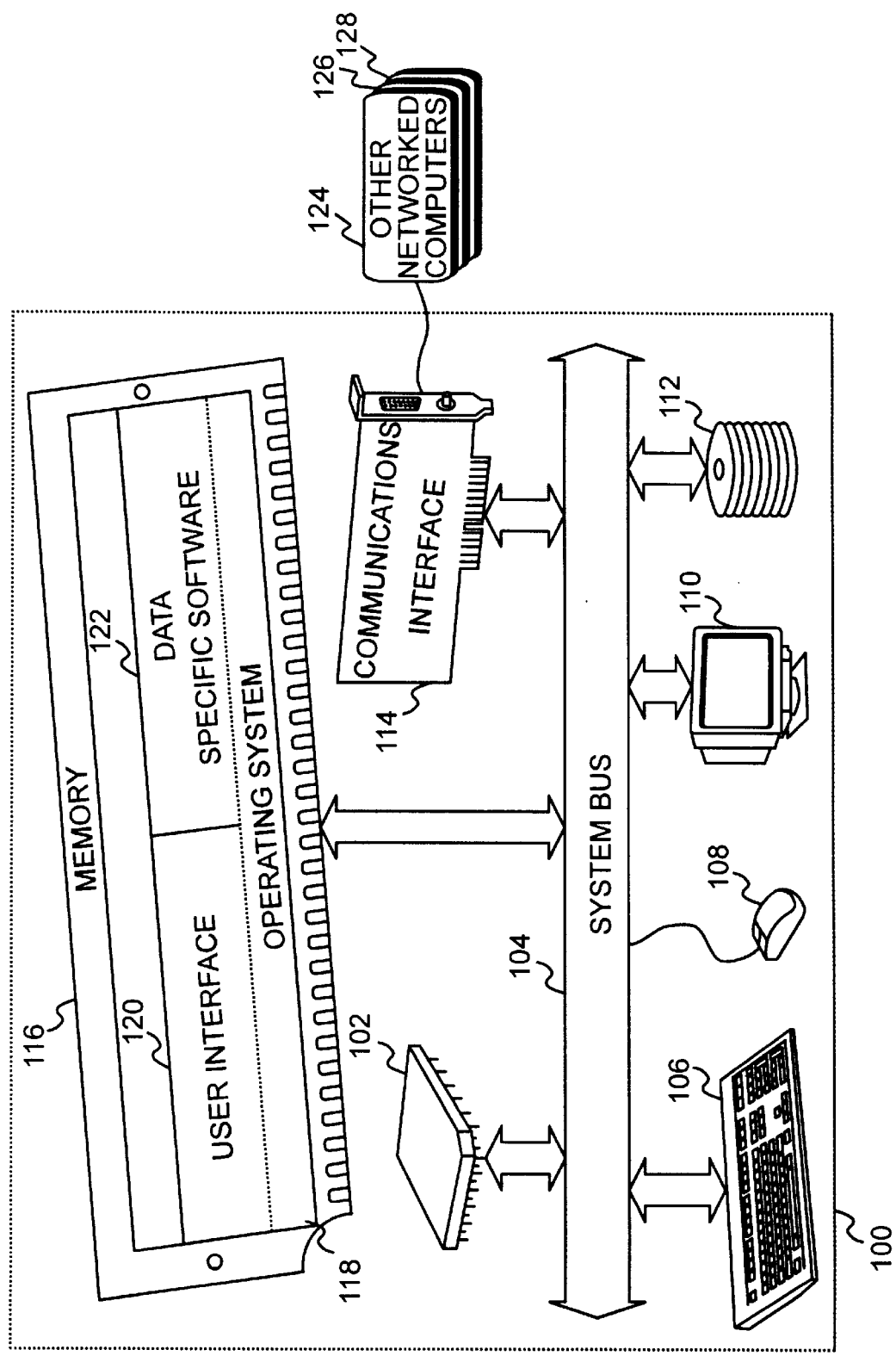
FIG. 1 shows a block diagram of a computer system containing the present invention.

FIG. 1 shows a block diagram of a computer system containing the present invention. Referring now to FIG. 1, the computer system 100 contains a processing element 102 which communicates to other elements of the computer system 100 over a system bus 104. A keyboard 106 and a mouse 108 provide input to the system 100 and a graphics display 110 allows software within the computer system 100 to output information, such as the digital map described below, to a user of the computer system 100. A disk 112 stores the software and data of the present invention and a network interface 114 allows the system 100 to interface to a network of other computer systems 124, 126, and 128 that also contain data and processing programs available to a user of the compute system 100.

A memory 116 of the computer system 100 contains an operating system 118. The memory 116 also contains user interface software 120 which displays a map to a user of the computer system 100 and then calls data specific software 122 to process data identified by a user of the computer system 100 through a map, to be described below.

Figure 2:
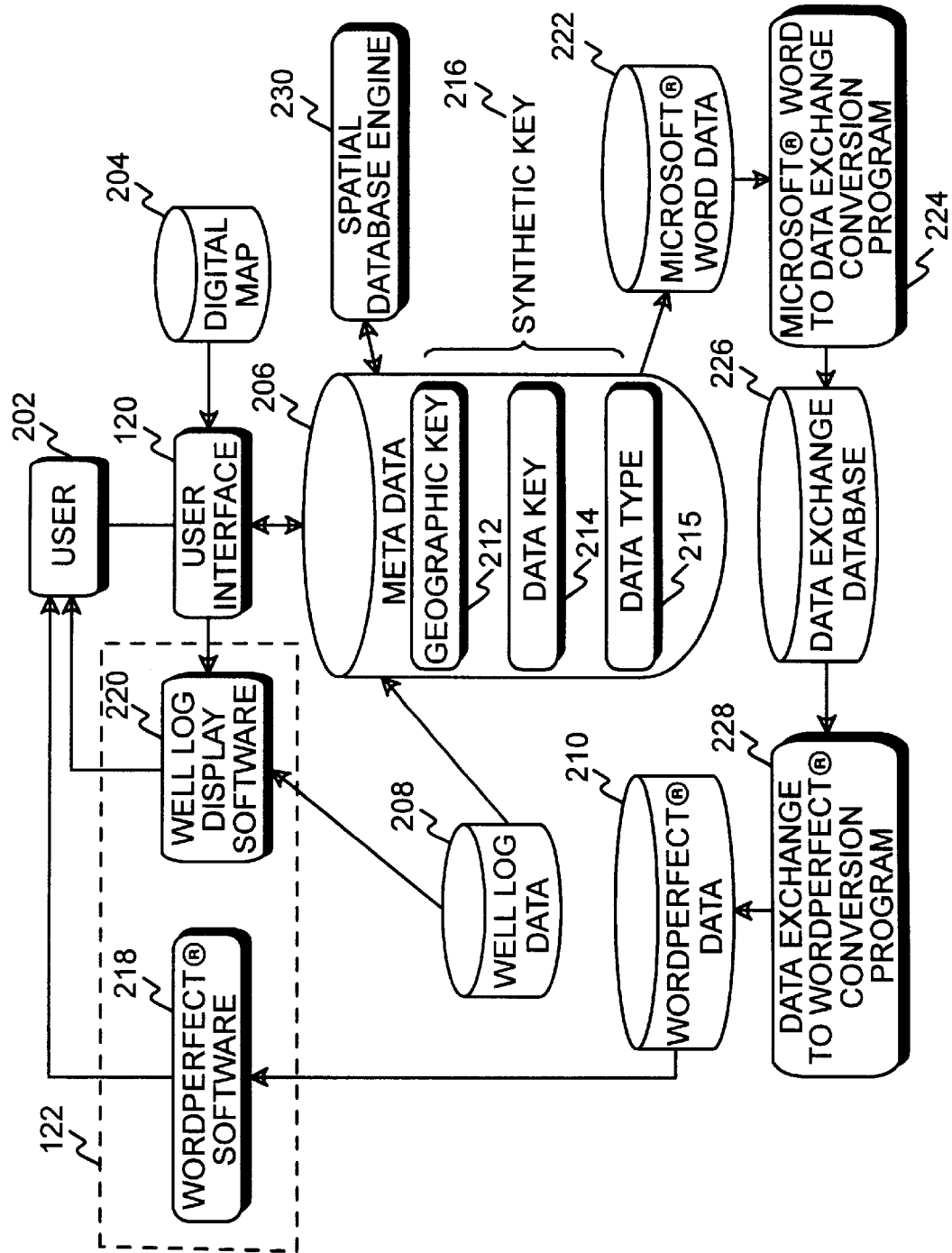
FIG. 2 shows a block diagram of the invention.

FIG. 2 shows a block diagram of the present invention. Referring to FIG. 2, a user 202 provides input to the user interface 120 (also shown in FIG. 1) through the computer system 100 (FIG. 1). The user interface 120 reads a digitized map 204, stored on the disk 112 (FIG. 1) and displays the map 204 on the graphics display 110 (FIG. 1) for the user 202 to view.

The user 202 selects a location on the map 204 using a pointing device 108 (FIG. 1). Once the user selects a geographic location, the user interface 120 accesses a spacial database engine 230 to extract a map key that identifies the geographic location and uses this map key to match a data key 214 within a metadata database 206. From the metadata 206, the user interface retrieves matching records, and from these records, the user interface 120 displays a list of data available for the geographic location selected by the user. From this list, the user selects data for viewing or processing. Once the user enters a selection, the user interface extracts a data type 215 from the metadata and uses this data type to identify and retrieve the program name and location for software that will perform the processing desired by the user. The user interface launches the software, and supplies the data file to the software, to perform the processing desired by the user.

For example, if the user selects a geographic location and that location contains a well, and well log data is available for the well, when the user selects the well log data for viewing, the user interface 120 launches well log display software 220 and supplies well log data 208 to the well log display software 220. The well log display software 220 then displays the well log data file 208 to the user 202.

Figure 3:
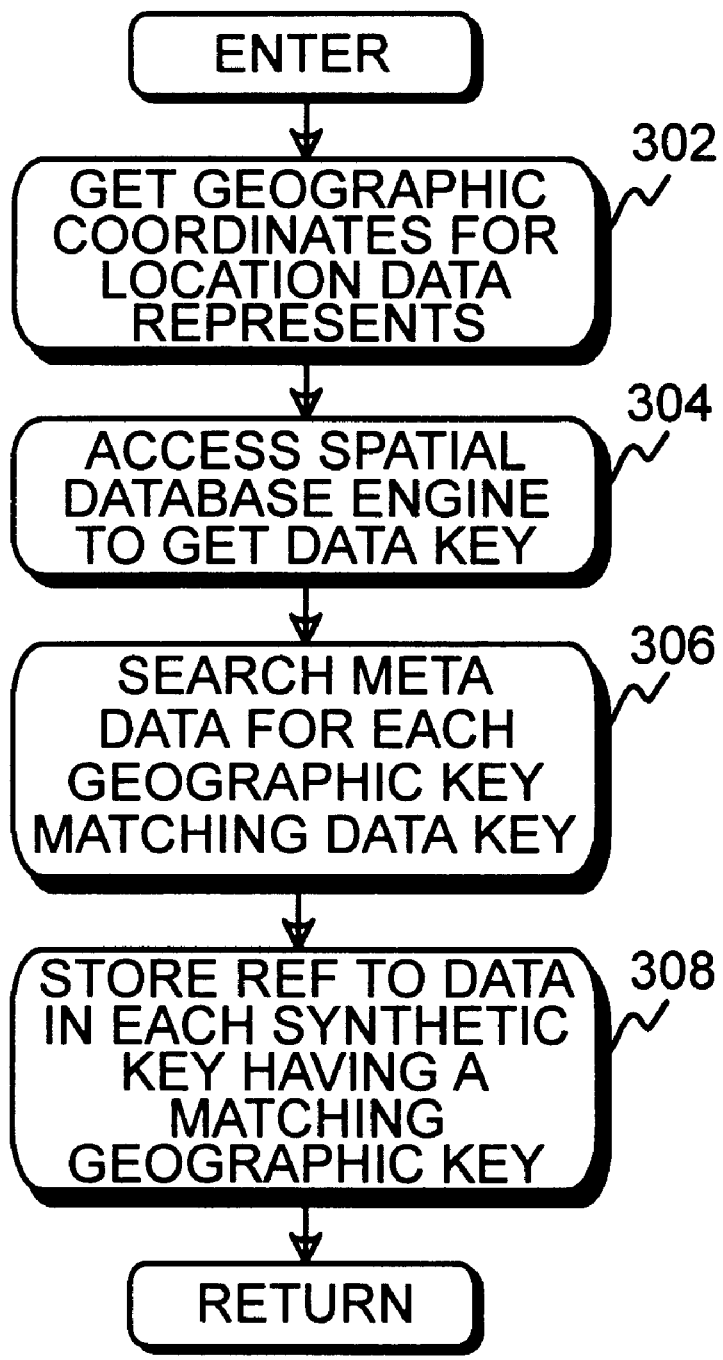
FIG. 3 shows a flowchart for storing data into the system.

FIG. 3 shows a flowchart of the process of accepting new data into the system. The data is some collection of information related to some feature at some particular geographic location. Thus, the data has a "geographic location" which is actually the location of the feature to which the data is related.

Referring to FIG. 3, after entry, bock 302 gets the geographic coordinates for the feature to which the data relates. For example, the data may be a report, created in a word processing system such as Microsoft® Word or WordPerfect®, relating to a geographic feature, for example an oil well located at some particular latitude and longitude.

Block 304 accesses a Spacial Database Engine 230 (FIG. 2) which matches the latitude and longitude of the data and returns a data key 214 representative of the latitude and longitude. By using this data key, the system can connect a feature at a particular location to a larger feature. For example, a well located along a coast line might be connected to the coast line feature, and might also be connected to the formation in which the well is located. Thus, a user could locate well log data for the well by identifying the well location on the map, or by identifying the coast line on the map, or by identifying the geographic formation containing the well on the map.

Once the data key is obtained, block 306 searches the metadata database to match the key for the data to the geographic keys for map locations. Block 308 then stores a reference to the data in each synthetic key 216 (FIG. 2) having a geographic key that matches the data key for the data. Along with the reference to the data, Block 308 stores the data type, from which, the system can determine software that will process the data.

FIG. 3 then returns to its caller.

Referring back to FIG. 2, the user 202 might select a type of data for a geographic location for which the user does not have a processing program. The user interface 120, through the metadata 206 can identify a conversion program to convert the data into a form for which the user does have a processing program available.

For example, if the user selected a geographic area and then selected data 222, in Microsoft® Word format, and the user did not have Microsoft® Word software available on their computer system, the user interface 120 could launch a conversion program 224 to convert the data file 222 into a common Data Exchange format and store the data in to a data exchange database 226. Once the data is stored in the data exchange database 226, the system can launch a conversion program 228 to convert the data from the data exchange format into a WordPerfect® formatted file 210, then launch WordPerfect® software 218 to display the program to the user 202.

In practice, data might conventionally be converted into the data exchange format whenever the data is accepted into the system, so that it is readily available to all users of the system, regardless of the type of software they have available to process the data.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method of processing data for a geographic location, said method comprising the steps of:
   (a) creating a metadata file containing records for at least one geographic location of a map;
   (b) accepting data connected to a geographic location;
   (c) creating a data synthetic key representative of said geographic location of said data accepted in step (b);
   (d) creating a record in said metadata file, wherein said record contains said data synthetic key created in step (c) for said data accepted in step (b), and further wherein said record identifies a file containing said data accepted in step (b);
   (e) accepting a geographic location on said map from a user of said method;
   (f) creating a map synthetic key for said location accepted in step (e);
   (g) processing each record in said metadata file and selecting each record that contains a data synthetic key that matches said map synthetic key;
   (h) displaying a list of items to the user, wherein each item represents data from one of said records selected in step (g);
   (i) accepting input from the user to select an item from said list displayed in step (h); and
   (j) executing processing software to process said data represented by said item selected in step (i).

2. The method of claim 1, wherein step (j) further comprises the steps of:
   (j1) when processing software is not available to process said data represented by said item selected in step (i), executing processing software to convert said data to data arranged in a second data format; and
   (j2) executing processing software to process said data arranged in said second format.

3. The method of claim 1, wherein step (j) further comprises the steps of:
   (j1) when processing software is not available to process said data represented by said item selected in step (i), executing processing software to convert said data to data arranged in a common data format;
   (j2) executing processing software to convert said data arranged in said common data format to data arranged in a second data format; and
   (j3) executing processing software to process said data arranged in said second format.

4. The method of claim 1, wherein steps (c) and (f) create said data synthetic key and said map synthetic key using an identical method.

5. The method of claim 4 wherein said identical method comprises executing a single computer program.

6. A system for processing data connected to a geographic location, said system comprising:
   a metadata file containing records for at least one geographic location of a map;

a storage device for storing data connected to a geographic location;

means for creating a data synthetic key for said data connected to a geographic location;

means for creating a record in said metadata file, wherein said record contains said data synthetic key and further wherein said record identifies a file containing said data connected to a geographic location;

means for accepting a geographic location on said map from a user;

means for creating a map synthetic key for said geographic location accepted from the user;

means for processing each record in said metadata file and selecting each record that contains a data synthetic key that matches said map synthetic key;

means for displaying a list of items to the user, wherein each item represents data from one of said selected records;

means for accepting input from the user to select an item from said list of items; and means for executing processing software to process the data represented by the item selected by the user.

7. The system of claim 6, wherein said means for executing further comprises:

means for converting said data selected by the user to data arranged in a second data format, when processing software is not available to process said data represented by said item selected by the user; and means for executing processing software to process said data arranged in said second format.

8. The system of claim 6, wherein said means for executing further comprises:

means for converting said data selected by the user to data arranged in a common data format, when processing software is not available to process said data selected by the user;

means for converting said data arranged in said common data format to data arranged in a second data format; and means for executing processing software to process said data arranged in said second format.

9. The system of claim 6, further comprising identical means for creating said data synthetic key and said map synthetic key.

10. The method of claim 9 wherein said identical means comprises a single computer program.

* * * * *